United States Patent
Hammerstrom et al.

(10) Patent No.: US 6,765,315 B2
(45) Date of Patent: Jul. 20, 2004

(54) BI-DIRECTIONAL REGULATOR/ CONVERTER WITH BUCK/BOOST BY FUZZY LOGIC CONTROL

(75) Inventors: Donald J. Hammerstrom, W. Richland, WA (US); Patrick Harman, Bellingham, WA (US)

(73) Assignee: International Power Systems, Inc., Alberta (CA)

( * ) Notice: Subject to any disclaimer, the term of this patent is extended or adjusted under 35 U.S.C. 154(b) by 0 days.

(21) Appl. No.: 10/099,463

(22) Filed: Mar. 14, 2002

(65) Prior Publication Data

US 2003/0006745 A1 Jan. 9, 2003

Related U.S. Application Data

(60) Provisional application No. 60/275,964, filed on Mar. 14, 2001.

(51) Int. Cl.[7] .................................................. H02J 7/00
(52) U.S. Cl. .............................. 307/66; 307/26; 700/50
(58) Field of Search ............................. 307/66, 26, 11, 307/22; 700/50, 297, 40, 44, 67; 323/283, 906

(56) References Cited

U.S. PATENT DOCUMENTS

| | | | | |
|---|---|---|---|---|
| 4,736,151 A | * | 4/1988 | Dishner | 323/224 |
| 5,696,439 A | * | 12/1997 | Presti et al. | 323/283 |
| 6,225,794 B1 | * | 5/2001 | Criscione et al. | 323/283 |
| 6,237,424 B1 | * | 5/2001 | Salmasi et al. | 73/861.17 |
| 6,275,018 B1 | * | 8/2001 | Telefus et al. | 323/282 |
| 6,304,068 B1 | * | 10/2001 | Hui et al. | 323/288 |
| 6,396,137 B1 | * | 5/2002 | Klughart | 257/691 |

FOREIGN PATENT DOCUMENTS

| | | |
|---|---|---|
| EP | 0756372 A1 | 1/1997 |
| EP | 0780750 A2 | 6/1997 |
| EP | 2001037101 | 2/2001 |

OTHER PUBLICATIONS

A. M. A. Mahmoud, H. M. Mashaly, S. A. Kandil, H. EL Khashab, M. N. F. Nashed, "Fuzzy Logic Implementation for Photovoltaic Maximum Power Tracking," IEEE 2000, pp. 735–740.

Tarun Gupta, R. R. Boudreaux, R. M. Nelms and John Y. Hung, "Implementation of a Fuzzy Controller for DC–DC Converters Using an Inexpensive 8–b Microcontroller," 1997 IEEE, pp. 661–668.

Suttichai Premrudeepreechacharn and Tongrak Poapornsawan, "Fuzzy Logic Control of Predictive Current Control for Grid–Connected Single Phase Inverter," IEEE 2000, pp. 1715–1718.

Bor—Ren Lin, "Analysis of Fuzzy Control Method Applied to DC–DC Converter Control," IEEE 1993, pp. 22–28.

W. C. So, C. K. Tse and Y.S. Lee, "A Fuzzy Controller for DC–DC Converters," IEEE 1994, pp. 315–320.

* cited by examiner

*Primary Examiner*—Shawn Riley
(74) *Attorney, Agent, or Firm*—Marger Johnson & McCollom, P.C.

(57) ABSTRACT

An interface between software and hardware, as well as a fuzzy logic control algorithm, for controlling a DC-DC converter or an AC-DC or DC-AC inverter are provided. A control circuit receives commands from a control logic to operate a converter or inverter in various operation modes. Control software inputs can be translated into signals to operate the converter or inverter. Control variables in the control software can be configured to operate under various control modes. If the converter or inverter cannot simultaneously meet the demands placed on two or more variables, the control logic can use prioritization to choose a more important constraint.

23 Claims, 3 Drawing Sheets

BI-DIRECTIONAL REGULATOR/ CONVERTER WITH BUCK/BOOST BY FUZZY LOGIC CONTROL

This application claims priority from U.S. Provisional Patent Application Serial No. 60/275,964, filed Mar. 14, 2001, the contents of which are incorporated herein by reference in their entirety.

BACKGROUND OF THE INVENTION

This application relates to a controller for managing the DC-DC Converter and Power Management Unit ("Converter") previously disclosed by Sustainable Energy Technologies ("SET") in U.S. Provisional Patent Application Serial No. 60/221,596, filed Jul. 28, 2000, U.S. patent application Ser. No. 09/917,256, filed Jul. 27, 2001, and International Application No. PCT/US01/23681, filed Jul. 27, 2001, the contents of which are hereby incorporated by reference. It also relates to a controller for managing other DC-DC converters, as well as AC-DC or DC-AC inverters.

SUMMARY OF THE INVENTION

According to various aspects and embodiments of the present invention, an interface between software and hardware to control a DC-DC converter or an AC-DC or DC-AC inverter is provided. Fuzzy logic control algorithms are also provided. Although a presently preferred algorithm is described herein, any control algorithm that provides the needed output control signals to the hardware can be used.

In one embodiment, designed for use with a DC-DC converter that permits bi-directional current flow, a control circuit receives commands from a control logic to operate a converter in one of four modes including boost right, buck right, boost left, and buck left modes. The control circuit also receives two modulating signals that are used to control the operating voltages and current in each of these modes. The inputs from the control software are translated into gate drive signals that operate power electronic gates included in the DC-DC converter design.

Control variables can be used as inputs to the control software. Various control modes are possible for each of the control variables. For example, each variable can be configured to operate freely with no constraints; operate freely within specified limits; maintain a specified set point; or track a variable analog input signal. The control logic can also provide for fuzzy prioritization of the demands for the different variables. If the converter/inverter cannot simultaneously meet the demands placed on two variables, it can choose the more important constraint.

A controller configured according to the principles of this invention can be used in various applications, including in conjunction with a step wave power converter in fuel cell systems and other systems that include a variable power source and a battery. The controller can also operate independently as the interface between two DC power systems, such as in telecommunications or automotive applications. In these cases, the interface would generally be between a variable power source and a fixed voltage DC distribution circuit backed up by a battery.

Some important features available through converter/inverter control using the principles of the present invention are described below. Among other things, flexible fuzzy logic software allows easy configuration for use in different applications, and allows for complex control constraints and strategies to be easily implemented and fine-tuned. For instance, a DC-DC converter can be controlled to perform maximum power point tracking as long as the control variables stay within their specified ranges. These ranges and the maximum power point tracking control parameters can be configurable independently.

In addition, proper control of a converter/inverter allows it to respond extremely quickly to changes in current demand while controlling other variables. The flexibility provided further allows the same power conversion hardware (converter/inverter) to be used in either the parallel (resource bus) configuration or in the series (battery bus) configuration, by simply interchanging the connections of the battery and the resource to the system. This allows a single product to be developed that can be used in either the resource bus or battery bus configuration; whichever is preferable for the given application.

BRIEF DESCRIPTION OF THE DRAWINGS

The foregoing objects, features, and advantages of the present invention will become more readily apparent from the following detailed description of preferred embodiments, made with reference to the following figures, in which.

DETAILED DESCRIPTION

Figure 1:
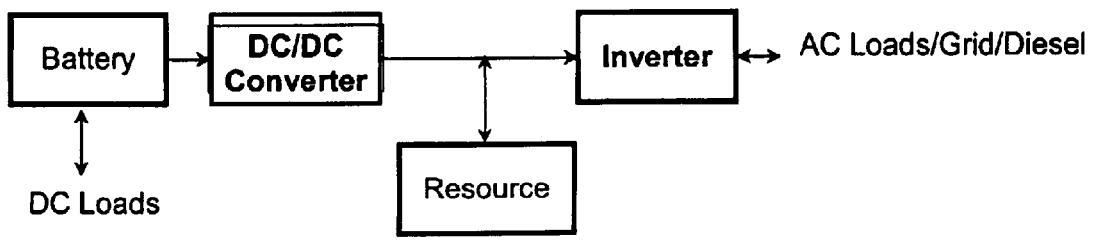
FIG. 1 is a block diagram of SET's parallel (or resource bus) DC-DC converter configuration.

The preferred circuits and control software described herein are designed to operate with SET's DC-DC Converter disclosed in U.S. Provisional Patent Application No. 60/221,596, filed Jul. 28, 2000, U.S. patent application Ser. No. 09/917,256, filed Jul. 27, 2001, and International Application No. PCT/US01/23681, filed Jul. 27, 2001. The converter described therein is extremely flexible and can accommodate bi-directional current flow in either a buck or a boost mode while controlling voltages on both the input and output. The DC-DC Converter can be used independently, with SET's step wave power converter (SWPC), described in U.S. Pat. No. 6,198,178, or with any other inverter as part of a hybrid power system, such as a fuel cell system or a photovoltaic (PV) system. The principles disclosed herein can be readily applied to other converter and inverter designs.

According to a preferred embodiment of the invention, a control circuit receives commands from a control logic to operate the converter in one of four modes, including: Boost Right, Buck Right, Boost Left, or Buck Left. The control circuit also receives two modulating signals that are used to control the operating voltages and current in each of these modes. The inputs from the control software are translated into gate drive signals that operate each of six power electronic gates included in the SET DC-DC Converter design.

The control software uses control variables to track and control operation of the control circuit. Various control modes are possible for each of the control variables. For example, each variable can be configured to operate freely with no constraints; to operate freely within specified limits; to maintain a specified set point; or to track a variable analog input signal. The control logic also provides fuzzy prioritization of the demands for the different variables. If the converter cannot simultaneously meet the demands placed on two variables, it can choose the more important constraint. For example, when the converter is charging batteries, it may try to increase the current flow. This may cause the battery voltage to rise if the battery is near full charge. As the battery voltage approaches its specified high limit, the converter would begin to decrease the current flow to keep the battery voltage below its specified limit.

The foregoing embodiment has been developed primarily for use with SET's SWPC, for use in fuel cell systems and other systems that include a variable power source and a battery (such as photovoltaic systems, small wind energy systems, and small hydro systems). The circuit can also operate independently, however. For instance, the circuit can operate as the interface between two DC power systems, such as in telecommunications or automotive applications. In this case, the interface could be located between a variable power source and a fixed voltage DC distribution circuit backed up by a battery. The control circuit can be implemented in any of a variety of ways, such as in a specially programmed integrated circuit or in hardware or firmware. Configuring a control circuit to perform the operations and accomplish the purposes identified herein is within the level of ordinary skill in the art. A detailed description of the physical construction thereof will therefore be omitted.

The flexible fuzzy logic software allows for easy configuration to different applications, and allows for complex control constraints and strategies to be easily implemented and fine-tuned. For instance, the DC-DC converter can be configured to perform maximum power point tracking as long as the control variables stay within their specified ranges. These ranges and the maximum power point tracking control parameters are independently configurable.

In addition, the ability of the DC-DC converter to respond extremely quickly to changes in current demand while controlling the other variables makes it ideal for use in SET's parallel (or resource bus) configuration, shown in FIG. 1. Referring to FIG. 1, the parallel power configuration has a significant efficiency advantage in applications where the variable resource is complemented by battery power to directly provide AC power to the loads. Two examples are residential fuel cell applications and grid connected PV-UPS applications.

Figure 2:
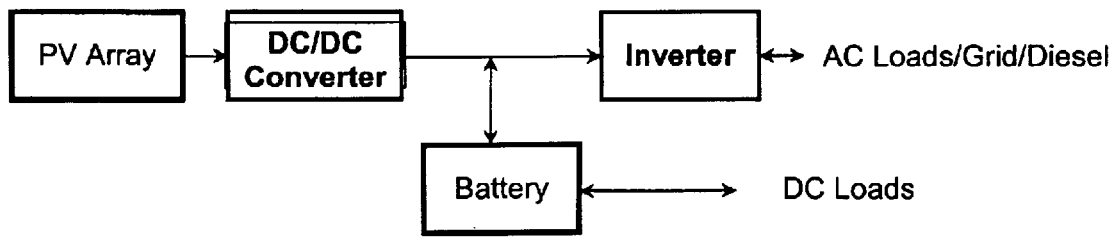
FIG. 2 is a block diagram of a series (or battery bus) converter configuration.

The flexibility of the circuit further allows the same power conversion hardware (converter/inverter) to be used in either the parallel (or resource bus) configuration shown in FIG. 1, or in the series (or battery bus) configuration shown in FIG. 2, by simply interchanging the connections of the battery and the resource to the system. This allows a single product to be developed that can be used in either the resource bus or battery bus configuration; whichever is preferable for the given application.

Figure 3:
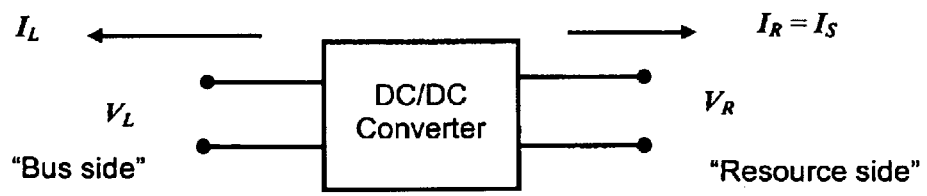
FIG. 3 is a bi-directional buck/boost block diagram.

Referring now to FIG. 3, a fuzzy algorithm can be used to control a bi-directional buck/boost DC-DC converter's operation. One goal of such an algorithm can be to achieve smooth full-scale response in 100 ms, regardless of the mode of operation. The algorithm described below is specifically adapted for use with a DC-DC converter. An algorithm used to control an AC-DC or DC-AC inverter would be slightly different.

Figure 4:
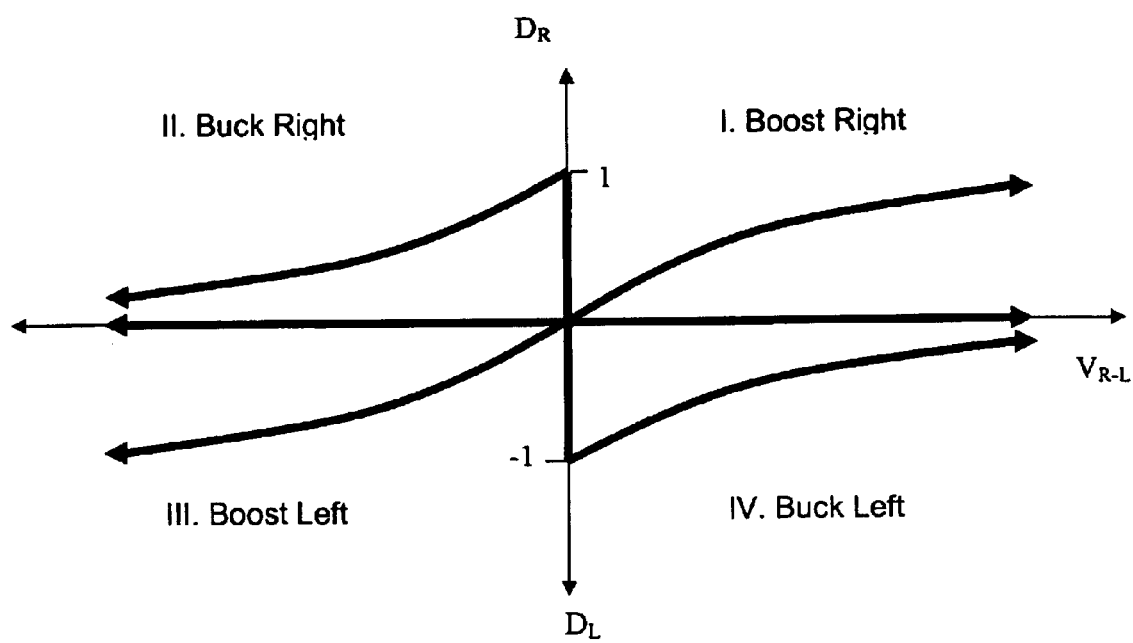
FIG. 4 is a graph representing duty cycle as a function of converter voltage difference in all operating modes.
Figure 5:
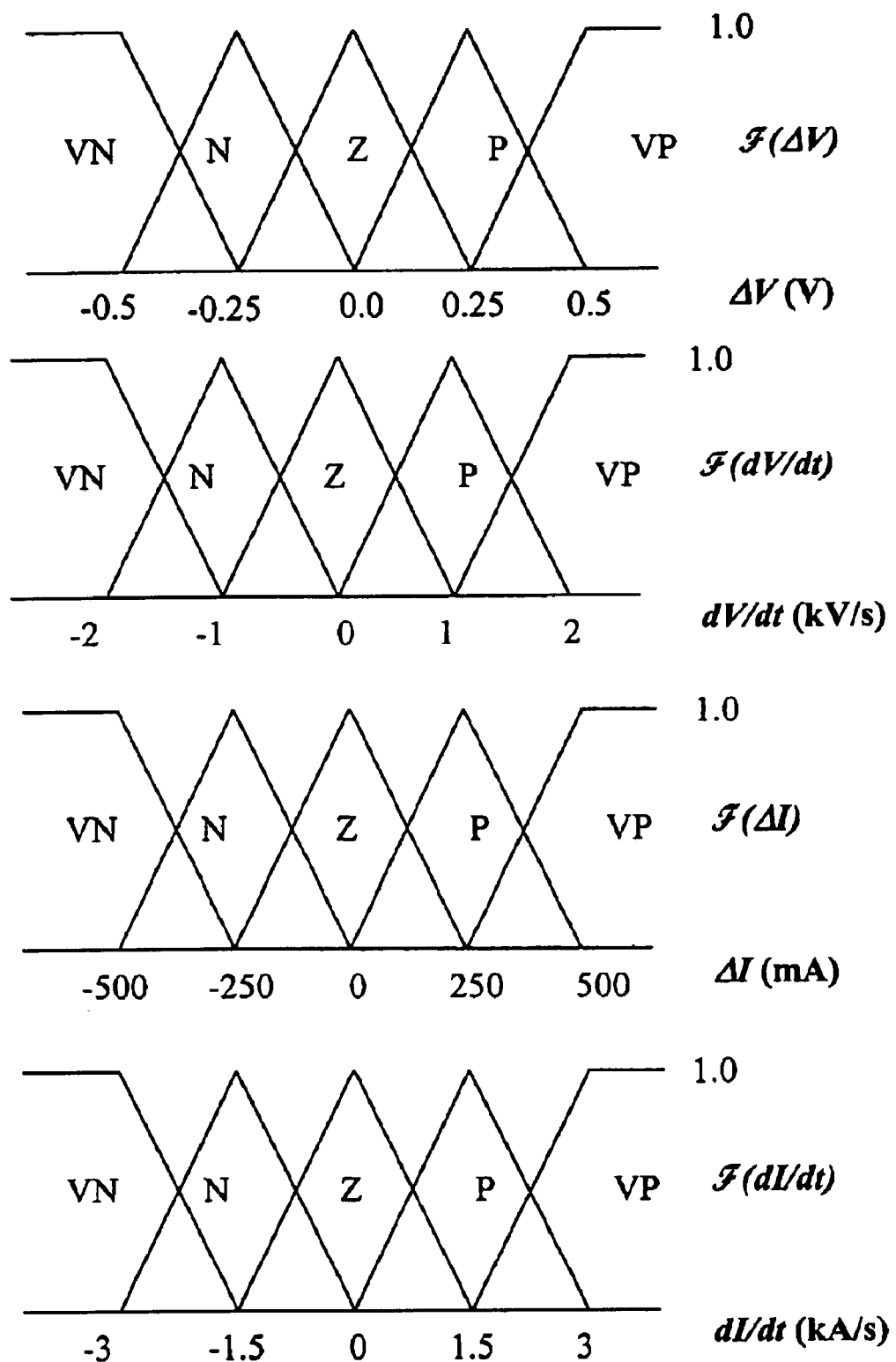
FIG. 5 is a diagram illustrating the membership of error components.

As shown in FIG. 4, the bi-directional operation of a buck/boost converter can be represented on a plane on which duty cycle is plotted as a function of voltage difference across the converter. On this plane, quadrants II and I represent power flow toward the right while quadrants III and IV represent power flow to the left. The right-hand quadrants represent cases where the right-side voltage exceeds the left; the left-hand quadrants represent cases where the converter's left-side voltage exceeds its right. The functions shown in each quadrant represent pairs of duty cycle and voltage difference at which the converter can function. The shapes of the functions are $D = V_S / (V_{R-L} + V_S)$; for bucking, and $D = V_{R-L} / (V_{R-L} + V_S)$; for boosting, where $V_S$ is the input voltage and $V_{R-L}$ is the difference between the converter's right- and left-side voltages.

Power is not represented explicitly on this diagram. Unlimited power can be transferred at any locus on this diagram except at the origin. For passive loads, the transferred power depends solely upon the output voltage. For nonlinear loads that additionally include battery cells or clamped voltages, the transferred power may depend upon much smaller voltage drops across the loads' internal impedances.

A brief description of each of the preferred variables is provided herein. $D_L$ and $D_R$ represent the duty cycle for sending current to the left and right, respectively. Duty cycle can be defined as the fraction of time that the converter is in conduction. $I_P$ is the current in Amperes that is injected into the DC bus at the left side of the converter, but it does not necessarily ever pass through the converter. This signal is not directly measurable at the terminals of the converter. Control of this current is associated with the parallel system configuration. $I_S$ is the current in Amperes that exits the right side ("resource side") of the converter. This converter measurement can be made directly at a right-side terminal of the converter.

$I_{P\ demand}$ is a demand signal placed on $I_P$ by the system. $I_{S\ demand}$ is a demand signal placed on $I_S$ by the system. The converter tries to track these demand signals. $\Delta I_P$ is the error signal $I_{P\ demand} - I_P$, and $F(\Delta I_P)$ is the fuzzy membership representation of this error. $\Delta I_S$ is the error signal $I_{S\ demand} - I_S$, and $F(\Delta I_S)$ is the fuzzy membership representation of this error. These errors are calculated to correct the converter's duty cycle. The response to a positive error should be the sending of more power toward the right ("resource") side of the converter.

$V_L$ is the potential on the left side of the converter. The left side of the converter is the "bus" potential in the parallel system architecture. $V_{L\ demand}$ is a demand signal placed on $V_L$ by the system. The converter also tries to track this demand signal. $\Delta V_L$ is the error signal $V_L - V_L$ demand, and $F(\Delta V_L)$ is the fuzzy membership representation of this error. This error is also calculated to correct the converter's duty cycle. It should be noted that the positions of the measurement and demand signals for this error signal calculation have been switched to correct the sign and make the value consistent with fuzzy membership function definitions. Accordingly, the response to a positive error should be the sending of more power toward the right ("resource") side of the converter.

$V_R$ is the potential on the right side of the converter. The right side is the battery (or "resource") potential in the parallel system architecture. $V_{R\ demand}$ is a demand signal placed on $V_R$ by the system. The converter further tries to track this demand signal. $\Delta V_R$ is the error signal $V_{R\ demand} - V_R$, and $F(\Delta V_R)$ is the fuzzy membership representation of this error. As with the other error signals, this error is calculated to correct the converter's duty cycle. Again, the response to a positive error should be the sending of more power toward the right ("resource") side of the converter.

$V_{R-L}$ is the difference $V_R-V_L$, and $F(V_{R-L})$ is the fuzzy membership representation of this difference. This signal is used to help determine whether the converter should buck or boost. OR is the function Max($num_1$, $num_2$, . . . ) that is commonly used for membership union in fuzzy logic. AND is the function Min($num_1$, $num_2$, . . . ) that is commonly used for membership junction in fuzzy logic. $F(e_R)$ is the error function $F(\Delta I_P)$, $F(\Delta I_S)$, $F(\Delta V_L)$, or $F(\Delta V_R)$ that has most recently been updated. This generalized variable is used because each calculation is similar once the voltage or current error has been assigned its fuzzy set memberships.

The following section describes fuzzy set membership assignment of measured error signals. The measurement errors are assigned fuzzy memberships according to the accompanying tables as pairs of measurements and demands become available. To assign fuzzy memberships, the error function $F(e_R)$, which is simply the fuzzy set membership for one of the four voltage or current error pairs, is calculated.

For example, assume $\Delta V_R$ has the value 0.375 V calculated from recently available measurement and demand signals. Then $\Delta V_R$ possesses equal 0.5 memberships in the fuzzy sets "P" and "VP" as calculated from the voltage membership functions. If $\Delta V_R$ has 0.5 membership in "P" and 0.5 membership in "VP", but the value of $\Delta I_S$ is 100 mA, the fuzzy set memberships of $\Delta I_S$ are then 0.4 membership in "P" and 0.6 membership in "Z", as can be estimated from the linear portions of the current error membership functions.

The value of $V_{R-L}$ is also calculated, and membership $F(V_{R-L})$ is assigned using the voltage error membership function. It should be noted that $F(V_{R-L})$ can be assigned from the voltage error table if one combines the "VP" and "VN" sets with "P" and "N", respectively.

The time rate of change of $e_R$ can then be calculated using a simple Euler approximation:

$$de_R/dt=[e_R(t)-e_R(t-\Delta t)]/\Delta t.$$

The action can eventually be based on the difference alone if sampling periods are constant, thus avoiding a floating-point division. Fuzzy memberships are then assigned to the calculated rate of error change in a manner similar to that used for calculating errors. The fuzzy set membership diagrams illustrate these membership functions.

The duty cycle correction can then be calculated given the memberships of error, memberships of error rate change, and current status (i.e., whether presently sending power to the left or right). Assuming power is presently being sent to the right, Table 1 should be used. In the second example above, the error $\Delta I_S$ has been measured, and fuzzy set membership has been determined. Assuming the last value of $\Delta I_S$ measured was 2500 mA about 500 μs ago, the calculated rate of change of $\Delta I_S$ is then −4.8 kA/s. This rate should be assigned unity membership in "VN" and null membership in every other fuzzy set. Due to the limited membership, only the shaded cells of Table 1 need be used.

TABLE 1

Duty cycle correction while sending power to the right (Relative to full-scale).

| de/dt \ e | VN | N | Z | P | VP |
|---|---|---|---|---|---|
| VP | −0.5 | −0.0 | 0.25 | 1.0 | 1.0 |
| P | — | — | 0.1 | 0.75 | 1.0 |
|   | 0.75 | 0.25 |   |   |   |
| Z | −1.0 | −0.5 | 0.0 | 0.5 | 1.0 |
| N | −1.0 | — | −1.0 | 0.25 | 0.75 |
|   |   | 0.75 |   |   |   |
| VN | −1.0 | −1.0 | −0.25 | 0.0 | 0.5 |

TABLE 2

Duty cycle correction while sending power to the left (Relative to full-scale).

| de/dt \ e | VN | N | Z | P | VP |
|---|---|---|---|---|---|
| VP | 1.0 | 1.0 | −0.25 | −0.0 | −0.5 |
| P | 1.0 | 0.75 | −0.1 | −0.25 | −0.75 |
| Z | 1.0 | 0.5 | 0.0 | −0.5 | −1.0 |
| N | 0.75 | 0.25 | 0.1 | −0.75 | 1.0 |
| VN | 0.5 | 0.0 | 0.25 | −1.0 | −1.0 |

The duty cycle corrections can be stated as follows: "If the error is zero ('Z') and the rate of error change is very negative ('VN'), then decrease the duty cycle by 0.25 of the maximum rate of change;" "If the error is positive ('P') and the rate of error change is very negative ('VN'), do not change the duty cycle." Although these objectives are apparently contradictory, the fuzzy control resolves the objectives using the fuzzy operator AND to determine the relative weighting of the objectives:

$(F(e_R)=$"Z") AND $(F(de_R/dt)=$"VN")=Min(0.6, 1.0) 0.6

$(F(e_R)=$"P") AND $(F(de_R/dt)=$"VN")=Min(0.4, 1.0)=0.4

A "center of gravity" approach is then used to calculate duty cycle from these two possible responses. The duty cycle is reduced by at least 0.15 of the maximum permissible change (one unit if the maximum rate of change is five units).

(0.6*(−0.25))+(0.4*0.0)/(0.6+0.4)=−0.15 (of maximum change)

Normally, because each error and error rate will have membership in not more than two fuzzy sets, the center of gravity approach will have to be used on four possible outcomes.

Because of an unusual accumulation of current and voltage errors, and because some of the errors will be unused and very near unity membership in "Z", an algorithm that prevents dilution of response by the unused error signals should be used. In a preferred algorithm, the maximum correction magnitude calculated for the four error pairs is used. For example, assuming the −0.15 response in the previous example has just been calculated and the three previous duty cycle magnitude corrections were 0.0, 0.10, and 0.0, then the value −0.15 would be used because it has the greatest magnitude. This magnitude of correction is continued until either another error calculation has greater magnitude or until the four most recent corrections have less magnitude. The most active error input controls the response with minimal dilution.

The correct table should be used for duty cycle correction. No change in duty cycle should be made if the converter is neither boosting nor bucking. The fact that the tables have a line of symmetry for the algorithm may be of additional use.

The maximum change in duty cycle is likely to be about five counts out of the full range of 1000. This estimate is based on the need to change full scale in 100 ms given only about 200 opportunities during those 100 ms to achieve that range. The PWM should therefore be updated once every 500 $\mu$s. The fraction of full scale is to be multiplied by the 5 counts and rounded to the nearest whole number.

Once the duty cycle response has been determined, a quick check should be made to determine if the direction of power flow should be changed and to determine whether the converter should buck or boost. This decision should only be made when there is an overflow or underflow of duty cycle. The following tables illustrate the transitions permitted during such underflow or overflow conditions. Table 3 represents permissible duty cycle transitions when the converter is presently neither bucking nor boosting. Table 4 represents permissible transitions when the converter underflows and is presently boosting. And Table 5 is used when the converter underflows and is presently bucking. The "0" or "1" after the new state indicates whether the bucking state should be initiated with the duty cycle zero or unity. "STOP" means that the gates can be turned off momentarily in neither the boost, buck, or right or left power states.

TABLE 3

Permissible duty cycle underflow transitions-no transfer state.

| $V_{R-L}$ \ e | VN | N | Z | P | VP |
|---|---|---|---|---|---|
| P | BuL (1) | BuL (0) | STOP | BoR (0) | BoR (0) |
| Z | BoL (0) | BuL (1) | STOP | BuR (1) | BoR (0) |
| N | BoL (0) | BoL (0) | STOP | BuR (0) | BuR (1) |

TABLE 4

Permissible underflow transitions if boosting prior to underflow.

| $V_{R-L}$ \ e | VN | N | Z | P | VP |
|---|---|---|---|---|---|
| P | BuL (0) | BuL (0) | STOP | BuL (1) | BuL (1) |
| Z | BuL (0) | BuL (0) | STOP | BuR (0) | BuR (0) |
| N | BuR (1) | BuR (1) | STOP | BuR (0) | BuR (0) |

TABLE 5

Permissible underflow transitions if bucking prior to underflow.

| $V_R - V_L$ \ e | VN | N | Z | P | VP |
|---|---|---|---|---|---|
| P | BuL (0) | BuL (0) | STOP | BoR (0) | BoR (0) |
| Z | BoL (0) | BoL (0) | STOP | BoR (0) | BoR (0) |
| N | BoL (0) | BoL (0) | STOP | BuR (0) | BuR (0) |

It is permissible for a bucking converter to overflow into another state according to Table 6. However, duty cycle should not be permitted to overflow while the converter is boosting. In fact, maximum duty cycle while boosting should be held no greater than 0.95 in both hardware and software.

TABLE 6

Permissible overflow transitions if bucking prior to overflow.

| $V_R - V_L$ \ e | VN | N | Z | P | VP |
|---|---|---|---|---|---|
| P | BoL (0) | BoL (0) | STOP | BoR (0) | BoR (0) |
| Z | BoL (0) | BoL (0) | STOP | BoR (0) | BoR (0) |
| N | BoL (0) | BoL (0) | STOP | BoR (0) | BoR (0) |

The state decisions depend on both the measured error and on the relative potential across the converter. Because the states are discrete rather than continuous, the decision can be made by majority membership that will quickly narrow the decision to a single new state. For example, using Table 3, if the error is mostly "P" and the potential difference is mostly "P", the new action is "BoR (0)"—set duty cycle to zero and boost to the right. This decision should not be reassessed until another underflow or overflow of the duty cycle occurs.

Following is a description of modes and imposed limits on the converter. As with the other aspects of this detailed description, the modes and limits are provided by way of example, but not of limitation. According to one configuration, the user interface is provided by three push-buttons ("select", "toggle up", "toggle down") and a small LCD display. Either toggle input can be configured to progress the user through the four analog feedback possibilities ($V_L$, $V_R$, $I_S$, and $I_P$). By pushing "select", a user can select and further inspect the selection. The user can further toggle through four options ("mode", "maximum limit", "minimum limit" and "next") for each of those feedback possibilities.

In "mode" the user can toggle through and select any of the three modes ("ignore", "track", and "set point"). In each of the "limit" selections the user can toggle the limits up and down by appropriate discrete units to select the limits. The LCD allows the user to recheck the settings, and the controlling variable and mode can be flashed onto the screen intermittently.

Following is a detailed description of various options and how they affect operation. A first voltage feedback signal $V_L$ represents the voltage at a left terminal of the converter. The converter can be configured to recognize any of three operating modes from user input: an ignore mode, a track mode, and a set point mode. In the ignore mode, the converter neither tracks an analog demand for nor creates a digital set point for $V_L$. The limits are still observed, however. In the track mode, the analog signal that corresponds to demand for this variable is tracked. The tracking mode for this variable can be overridden if any of the other three variables are in track or set point mode or if a limit for this variable is exceeded. The digitized value of this variable is never permitted to exceed its limits. In the set point mode, a user-defined set point for this variable is attained and held. The set point mode for this variable can be overridden if any of the other three variables are in track or set point mode or if a limit for this variable is exceeded. The user-defined set point is never permitted to exceed its limits.

Various limits can be provided for this variable. Among other limits, no digitized demand or set point for this variable should be permitted to exceed the value of a maximum voltage limit. Power exchange is affected by this limit regardless of the control mode that is in effect. In this embodiment, the maximum voltage limit cannot exceed 90V, which represents a default voltage value determined by hardware capabilities. Similarly, no digitized demand or set point for this variable is permitted to fall below the value of the minimum voltage limit. Power exchange is affected by this limit regardless of the control mode in effect. The minimum voltage limit in this embodiment is not set below 0V.

A second voltage feedback signal $V_R$ represents the voltage at a right terminal of the converter. The same modes and limits described above with respect to $V_L$ are applicable to this variable.

Current feedback signals are also provided. A first current feedback signal $I_S$ represents the current exiting the right terminal of the converter. The converter can again be configured to recognize any of three operating modes from user input. In the ignore mode, the converter neither tracks an analog demand for nor creates a digital set point for this variable. Limits are still observed, however. In a track mode, the analog signal that corresponds to this variable is tracked. The tracking mode for this variable can be overridden if any of the other three variables are in track or set point mode or if a limit for this variable is exceeded. The digitized value of this variable should not be permitted to exceed its limits. In the set point mode, a user-defined set point for this variable is attained and held. The set point mode for this variable can be overridden if any of the other three variables are in track or set point mode or if a limit for this variable is exceeded. The user-defined set point should not be permitted to exceed its limits.

The limits for this variable include a maximum and minimum current limit. No digitized demand or set point value for this variable should be permitted to exceed the maximum current limit. Power exchange is affected by this limit regardless of the control mode that is in effect. The maximum current limit in this embodiment cannot exceed 200 Amperes, which represents a default current determined by hardware capabilities. Similarly, no digitized demand or set point value for this variable should be permitted to fall below the minimum current limit. Power exchange is affected by this limit regardless of the control mode in effect. In this embodiment, the minimum current limit cannot be set below −250 Amperes, which is also a default current determined by hardware capabilities.

A second current feedback signal $I_P$ represents a current injected into the DC bus at the left terminal of the converter. The modes and limits explained above with respect to the first current feedback signal $I_S$ are also applicable to the second current feedback signal $I_P$.

Following is sample pseudocode that may be used with the various DC-DC converter modes according to one embodiment of the present invention.

```
Direction = "R"
    V_R
        MODE(V_R) ∈ {TRACK, SET POINT, IGNORE} (set by user)
        If MODE(V_R) ∈ {TRACK, SET POINT},
            Assure V_R DEMAND = [V_R MINIMUM, V_R MAXIMUM]
            ΔV_R = V_R DEMAND − V_R
        ELSE IF V_R ≥ V_R MAXIMUM,
            ΔV_R = V_R MAXIMUM − V_R
        ELSE IF V_R ≤ V_R MINIMUM,
            ΔV_R = V_R MINIMUM − V_R
        ELSE
            ΔV_R = VP ("VP" = a very positive error)
        END IF
    V_L
        MODE(V_L) ∈ {TRACK, SET POINT, IGNORE} (set by user)
        If MODE(V_L) ∈ {TRACK, SET POINT},
            Assure V_L DEMAND = [V_L MINIMUM, V_L MAXIMUM]
            ΔV_L = V_L − V_L DEMAND
        ELSE IF V_L ≥ V_L MAXIMUM,
            ΔV_L = V_L − V_L MAXIMUM
        ELSE IF V_L ≤ V_L MINIMUM,
            ΔV_L = V_L − V_L MINIMUM
        ELSE
            ΔV_L = VP ("VP" = a very positive error)
        END IF
    I_S
        MODE(I_S) ∈ {TRACK, SET POINT, IGNORE} (set by user)
        If MODE(I_S) ∈ {TRACK, SET POINT},
            Assure I_S DEMAND = [I_S MINIMUM, I_S MAXIMUM]
            ΔI_S = I_S DEMAND − I_S
        ELSE IF I_S ≥ I_S MAXIMUM,
            ΔI_S = I_S MAXIMUM − I_S
        ELSE IF I_S ≤ I_S MINIMUM,
            ΔI_S = I_S MINIMUM − I_S
        ELSE
            ΔI_S = VP ("VP" = a very positive error)
        END IF
    I_P
        MODE(I_P) ∈ {TRACK, SET POINT, IGNORE} (set by user)
        If MODE(I_P) ∈ {TRACK, SET POINT},
            Assure I_P DEMAND = [I_P MINIMUM, I_P MAXIMUM]
            ΔI_P = I_P DEMAND − I_P
        ELSE IF I_P ≥ I_P MAXIMUM,
            ΔI_P = I_P MAXIMUM − I_P
        ELSE IF I_P ≤ I_P MINIMUM,
            ΔI_P = I_P MINIMUM − I_P
        ELSE
            ΔI_P = VP ("VP" = a very positive error)
```

-continued

```
        END IF
Direction = "L"
    V_R
        MODE(V_R) ∈ {TRACK, SET POINT, IGNORE} (set by user)
        If MODE(V_R) ∈ {TRACK, SET POINT},
            Assure V_R DEMAND = [V_R MINIMUM, V_R MAXIMUM]
            ΔV_R = V_R DEMAND - V_R
        ELSE IF V_R ≥ V_R MAXIMUM,
            ΔV_R = V_R MAXIMUM - V_R
        ELSE IF V_R ≤ V_R MINIMUM,
            ΔV_R = V_R MINIMUM - V_R
        ELSE
            ΔV_R = VN ("VN"= a very negative error)
        END IF
    V_L
        MODE(V_L) ∈ {TRACK, SET POINT, IGNORE} (set by user)
        If MODE(V_L) ∈ {TRACK, SET POINT},
            Assure V_L DEMAND = [V_L MINIMUM, V_L MAXIMUM]
            ΔV_L = V_L - V_L DEMAND
        ELSE IF V_L ≥ V_L MAXIMUM,
            ΔV_L = V_L - V_L MAXIMUM
        ELSE IF V_L ≤ V_L MINIMUM,
            ΔV_L = V_L - V_L MINIMUM
        ELSE
            ΔV_L = VN ("VN" = a very negative error)
        END IF
    I_S
        MODE(I_S) ∈ {TRACK, SET POINT, IGNORE} (set by user)
        If MODE(I_S) ∈ {TRACK, SET POINT},
            Assure I_S DEMAND = [I_S MINIMUM, I_S MAXIMUM]
            ΔI_S = [I_S DEMAND - I_S
        ELSE IF I_S ≥ I_S MAXIMUM,
            ΔI_S = I_S MAXIMUM - I_S
        ELSE IF I_S ≤ I_S MINIMUM,
            ΔI_S = I_S MINIMUM - I_S
        ELSE
            ΔI_S = VN ("VN" = a very negative error)
        END IF
    I_P
        MODE(I_P) ∈ {TRACK, SET POINT, IGNORE} (set by user)
        If MODE(I_P) ∈ {TRACK, SET POINT},
            Assure I_P DEMAND = [I_P MINIMUM, I_P MAXIMUM]
            ΔI_P = I_P DEMAND - I_P
        ELSE IF I_P ≥ I_P MAXIMUM,
            ΔI_P = I_P MAXIMUM - I_P
        ELSE IF I_P ≤ I_P MINIMUM,
            ΔI_P = I_P MINIMUM - I_P
        ELSE
            ΔI_P = VN ("VN" = a very negative error)
        END IF
```

Having described and illustrated the principles of the invention in various embodiments thereof, it should be apparent that the invention can be modified in arrangement and detail without departing from such principles. Among other things, it should be noted that the preferred embodiments described above can be readily modified for use with AC-DC or DC-AC inverters, in addition to various types and configurations of DC-DC converters. We therefore claim all modifications and variations coming within the spirit and scope of the following claims.

What is claimed is:

1. A controller configured to control voltages and current direction in a converter or inverter, comprising:

a control logic configured to detect voltage levels on each side of a converter or inverter; and a control circuit configured to receive commands from the control logic to select an operation mode;

wherein the converter or inverter is configured to be operated based on signals from the control circuit to control voltage and current in the converter or inverter.

2. A controller according to claim 1, wherein the operation mode is selected from a group comprising a boost right mode, a buck right mode, a boost left mode, and a buck left mode.

3. A controller according to claim 1, further comprising control software configured to control the control logic.

4. A controller according to claim 3, wherein the control software comprises a plurality of control variables.

5. A controller according to claim 4, wherein each control variable is configured to operate freely with no constraints, to operate freely within specified limits, to maintain a specified set point, or to track a variable analog input signal.

6. A controller according to claim 1, wherein the control logic is further configured to prioritize demands for control variables.

7. A controller according to claim 6, wherein the control logic is configured to choose a more important control variable when the converter or inverter cannot simultaneously meet the demands placed on two control variables.

8. A controller according to claim 1, wherein the controller is used in conjunction with a DC to DC converter.

9. A controller according to claim 8, wherein the DC to DC converter is used in conjunction with a step wave power converter.

10. A method of controlling voltages and current direction in a converter or inverter, comprising:

detecting inputs on each side of a converter or inverter;

selecting an operation mode for the converter or inverter based upon a difference between the inputs; and controlling the converter or inverter to cause it to operate in the selected operation mode.

11. A method according to claim 10, wherein the operation mode comprises a mode selected from a group comprising a boost right mode, a buck right mode, a boost left mode, and a buck left mode.

12. A method according to claim 10, further comprising configuring one or more control variables to operate freely with no constraints.

13. A method according to claim 10, further comprising configuring one or more control variables to operate freely within specified limits.

14. A method according to claim 10, further comprising configuring one or more control variables to maintain a specified net point.

15. A method according to claim 10, further comprising configuring one or more control variables to track a variable analog input signal.

16. A method according to claim 10, further comprising prioritizing demands for control variables by selecting a more important constraint where the converter cannot simultaneously meet the demands of two or more control variables.

17. A fuzzy logic controller, comprising:

a control logic;

a control circuit configured to receive instructions from the control logic and to control voltage inputs and current direction in a converter or inverter; and control software comprising a plurality or control variables configured to monitor and respond to voltage and current demand.

18. A fuzzy logic controller according to claim 17 wherein the control software is configured to track a voltage demand on each side of the converter or inverter.

19. A fuzzy logic controller according to claim 17, wherein the control circuit is configured to modify a duty cycle of a converter or inverter based on fuzzy set memberships of the control variables.

20. A fuzzy logic controller according to claim 17, wherein the fuzzy logic controller is configured to prioritize a response to control variables where the demands of two or more control variables conflict with each other.

21. A controller configured to control voltages and current direction in a converter or inverter, comprising:

a control logic configured to detect voltage levels on each side of a converter or inverter;

a control circuit configured to receive commands from the control logic to select an operation mode, wherein the operation mode is selected from a group consisting of a boost right mode, a buck right mode, a boost left mode, and a buck left mode; and wherein the converter or inverter is configured to be operated based on signals from the control circuit to control voltage and current in the converter or inverter.

22. A controller configured to control voltages and current direction in a converter, wherein the converter comprises a DC to DC step wave power converter, comprising:

a control logic configured to detect voltage levels on each side of the converter;

a control circuit configured to receive commands from the control logic to select an operation mode; and wherein the converter is configured to be operated based on signals from the control circuit to control voltage and current in the converter.

23. A method of controlling a converter or inverter, comprising:

detecting inputs an each side of a converter or inverter;

selecting an operation mode for the converter or inverter in response to a difference between the inputs, wherein the operation mode comprises a mode selected from a group consisting of a boost right mode, a buck right mode, a boost left mode, and a buck left mode; and controlling the converter or inverter to cause it to operate in the selected operation mode.

\* \* \* \* \*

UNITED STATES PATENT AND TRADEMARK OFFICE
CERTIFICATE OF CORRECTION

PATENT NO. : 6,765,315 B2
DATED : July 20, 2004
INVENTOR(S) : Hammerstrom et al.

It is certified that error appears in the above-identified patent and that said Letters Patent is hereby corrected as shown below:

Column 4,
Line 48, "$V_L$-$V_L$ demand, and" should read -- $V_L$-$V_{L\ demand}$, and --.

Column 10,
Line 41 of table, "$I_p$ DEMAND =" should read -- $I_{p\ DEMAND}$ = --.
Line 42 of table, "$I_p$ DEMAND- $I_p$" should read -- $I_{p\ DEMAND}$- $I_p$ --.

Column 13,
Line 20, "specified net point." should read -- specified set point. --.

Signed and Sealed this

First Day of March, 2005

JON W. DUDAS
*Director of the United States Patent and Trademark Office*